R. W. KAVANAUGH.
Apparatus for Teaching Arithmetic.
No. 196,583          Patented Oct. 30, 1877.
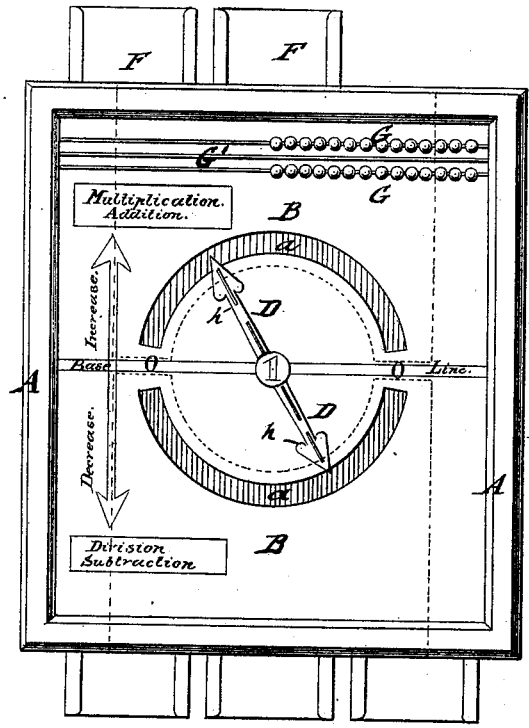
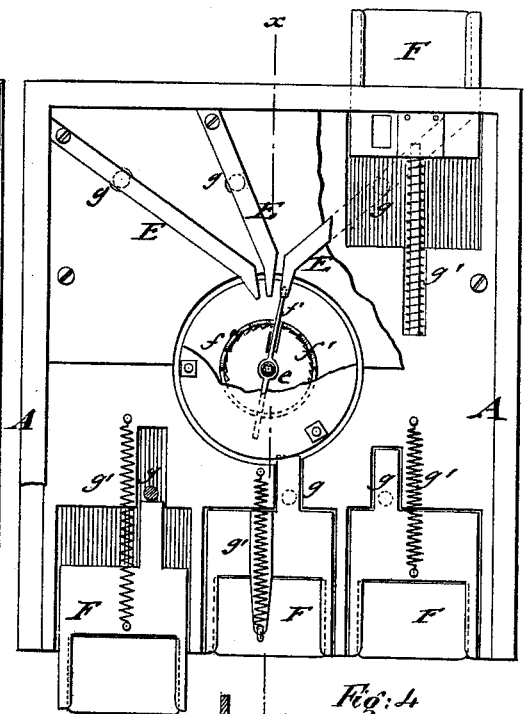
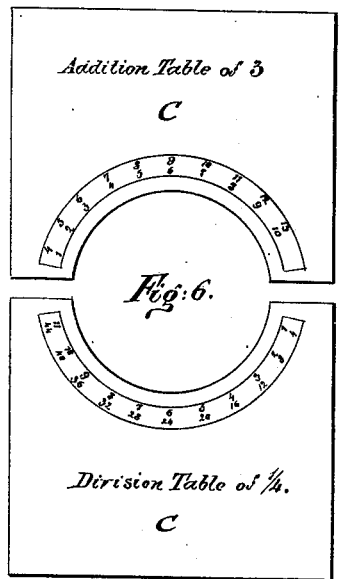
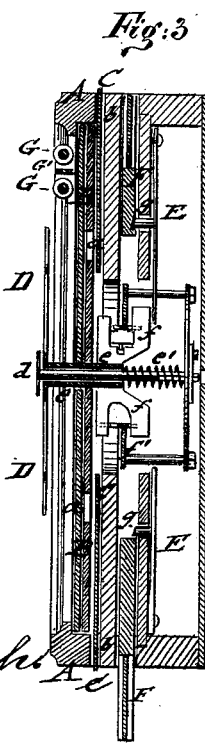
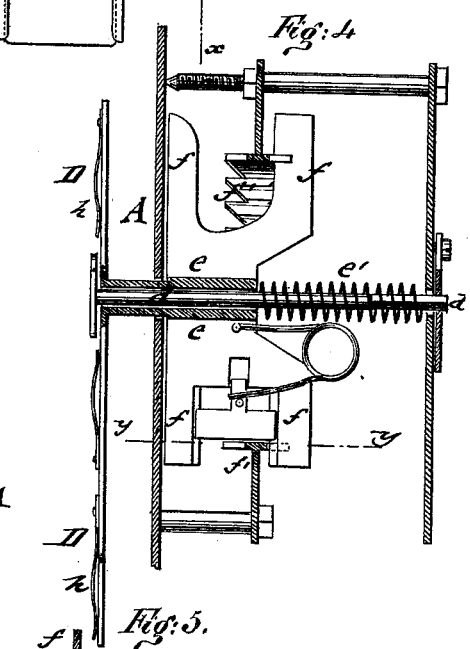
WITNESSES:
Chas. Nida.
J. H. Scarborough.
INVENTOR:
R. W. Kavanaugh
BY Munn & Co.
ATTORNEYS.

UNITED STATES PATENT OFFICE.

RICHARD W. KAVANAUGH, OF CHAPLIN, KENTUCKY.

IMPROVEMENT IN APPARATUS FOR TEACHING ARITHMETIC.

Specification forming part of Letters Patent No. 196,583, dated October 30, 1877; application filed August 3, 1877.

*To all whom it may concern:*

Be it known that I, RICHARD W. KAVANAUGH, of Chaplin, in the county of Nelson and State of Kentucky, have invented a new and Improved Apparatus for Teaching Arithmetic, of which the following is a specification:

The object of this invention is to furnish an improved apparatus for teaching arithmetic that is based on the principle of object-teaching, and has the advantages that the whole attention of the child is gained, that the adding or subtracting of things of the same denomination is clearly rendered perceptible, and the different abstract processes in addition, subtraction, multiplication, and division of numbers and fractions fully elucidated and illustrated, so as to be comprehended by the reason, and not merely committed mechanically to memory.

The invention consists of a face-plate with semicircular slots placed symmetrically above and below a horizontal base-line, back of which different cards with figures illustrating subtraction, &c., are placed.

A sliding and spring-acted index-hand turns around a fixed figure, 1, representing the unit, and is pressed with the same back, so as to engage by pawls a fixed double ratchet-wheel, and be turned thereby, engaging successively a number of lever-arms that release sliding and spring-acted card or object holders. These object-holders contain suitable cards, and are either thrown out or drawn in in connection with the index-hand, so as to illustrate addition or subtraction.

A number of balls are strung up on parallel rods at the front of the apparatus, and divided by a separating-line for illustrating fractions.

In the accompanying drawing, that illustrates my invention, Figure 1 represents a front view, Fig. 2 a rear elevation with parts cut off, and Fig. 3 a vertical transverse section on line $x\,x$, Fig. 2, of my improved apparatus for teaching arithmetic. Figs. 4 and 5 are detail vertical transverse and horizontal sections, the latter on line $y\,y$, Fig. 4, of the ratchet mechanism; and Fig. 6 represents two cards, respectively, for addition and division, as used in connection with the apparatus.

Similar letters of reference indicate corresponding parts.

A represents a frame or case of suitable size, which is provided with a face-plate, B, of sheet metal or other material, that is arranged with a horizontal base-line, and at right angles thereto with a double arrow, of which one end points upward to the words "Addition and Multiplication," the other end downward to the words "Subtraction and Division," while the words "Increase" and "Decrease" are placed respectively alongside of the upper and lower parts of the arrow, so as to be indicative of the principle that addition and multiplication are increasing, subtraction and division decreasing, operations.

Semicircular slots $a$, of suitable width, are arranged symmetrically to the base-line, and serve to exhibit the figures on a series of cards, C, which are inserted through top or bottom slots $b$ of the frame back of the face-plate, so that the figures printed thereon are visible through the slots. On a sliding but axially-fixed center-post, $d$, of the apparatus is placed the figure 1, which remains stationary, being representative of the unity or center from which all arithmetical operations start.

A double pointer or index-hand, D, is turned by means of a sleeve, $e$, on the center-post $d$, and is pressed by a spiral spring, $e'$, against the figure 1, at the end of the center-post.

The sleeve of the pointer D is provided with diametrical arms or pawls $f$, that are recessed so as to engage the teeth of a fixed double-ratchet, $f'$, that is arranged in the recesses of the forked or double pawls, as shown in Figs. 4 and 5. By pressing on the center of the pointer, and on the figure 1, they both slide back until forming contact with the face-plate or glass front, the figure 1 remaining fixed while the pointer is turned for the distance of two teeth around the center-post, by the forked pawls engaging in one direction the teeth of one section, and by the return-motion caused by the spring the teeth of the other ratchet-section.

The pointer or index-hand traverses in this manner first along the figures visible through the upper slots, so as to illustrate "increase"

or addition, and then along the lower figures, indicating "decrease" or substraction.

The forked revolving pawls $f$ also form contact with spring-lever arms E, that extend at the back of the apparatus, and connect by catch-pins or stops $g$ with sliding and spring-acted card or object holders F, that are guided in recesses of the upper and lower parts of the frame or casing A.

Any suitable number of object-holders and releasing-arms may be arranged in a large apparatus, twelve at the upper and twelve at the lower part being the number preferred.

The object-holders at the upper part are so guided and acted upon by spiral springs $g'$ that they are thrown out when their arms are raised by the pawl, the lower object-holders being first drawn out and their springs arranged so as to be quickly drawn in, when the arms are engaged by the pawls.

The object-holders may receive cards with suitable pictures or objects that illustrate the different steps in the arithmetical operations simultaneously with the progress of the index-hand along the cards of the face-plate.

For operating the apparatus one end or arrow of the double pointer is marked with a small card that is slipped into one of the spring-holders $h$ of the same at either end, and which correspond with the card inserted back of the face-plate.

By pressing briskly on the center-post and releasing it suddenly the index-hand will traverse the upper or lower half of the face-plate, and simultaneously therewith throw out the object-cards for addition, or withdraw them for substraction.

As the pictures on the object-cards correspond with the figures to which the index-hand points, the child is taught addition of objects at the same time with figures. The pictures serve also to convey the idea that things of the same kind or denomination only can be added, for as soon as cards with different kinds of objects are inserted the child can readily see that the different things cannot be added, but that they must be of the same kind.

After simple addition of unit to unit has been fully explained by the appearance of the object-cards the addition of two, three, &c., may be illustrated in the same manner by different face-figures and object-cards.

Subtraction is illustrated in analogous manner by the pointer passing along the lower half of the apparatus in connection with the object-cards, which successively disappear as the arms are raised by the motion of the pointer.

Multiplication and division are also explained in the same manner, as they are merely a shorter method of addition or subtraction.

These different operations impress themselves on the minds of the children in clear and rational manner, and remain thereby fully impressed on the memory, they being enabled thereby to see clearly the reason of each operation, without being compelled to merely mechanically commit the different operations to memory. The mind of the child is therefore by this method strengthened and the reasoning faculty developed, and not cramped and hampered, as by the present methods.

The fractions are illustrated by two rows of balls or buttons, G, which are strung up on parallel rods at the front part of frame A and separated by a dividing-line, G'. The balls are intended to indicate the numerators and denominators of fractions, and give an object representation of fractions by taking a certain number of balls from the upper row, and another number from the lower row.

By arranging several fractions of like denominators the adding and subtracting of the same may be illustrated, and in analogous manner may the method of finding the greatest common divisor and the least common multiple and other processes be explained, and be made so clear by the teacher that any child can fully understand it.

The apparatus may also be used at the pleasure of the teacher for illustrating other more complicated operations, such as arithmetical and geometrical progressions, &c., as will be readily perceived by any one conversant with the principles of the same.

The multiplication and division of fractions may also be exemplified by the apparatus on the principle that multiplying by a fraction decreases the quantity, and dividing by a fraction increases the quantity. It can be readily explained why in division of a fraction the divisor is inverted and then proceeded with as in multiplication, and also why in multiplying two fractions the numerators have to be multiplied for a new numerator, and in similar manner the denominators multiplied for a new denominator. This is illustrated by the sections marked "increase" and "decrease," the multiplication of fractions bringing the pointer down into the lower half and the division into the upper half of the face-plate. The beginners are thus assisted to form proper ideas of arithmetic at the start, and not compelled to grope along on wrong theories, which cloud up the mind.

The apparatus forms really an application of the principle of object-teaching to arithmetic, and facilitates the labors of the teacher, while impressing the different arithmetical operations in perfectly lucid and clear manner on the mind of the child.

Having thus described my invention, I claim as new and desire to secure by Letters Patent—

1. An apparatus for teaching arithmetic, consisting essentially of a slotted face-plate, figure-cards inserted back of the same, a traversing pointer, and of a series of object-holders arranged along the upper and lower parts of the face-plate, so as to appear or disappear simultaneously with the progress of the pointer, substantially as specified.

2. The combination of the sliding center-post, carrying the unit-figure 1 with the sliding and spring-acted sleeve of the pointer, having forked pawls and a fixed double ratchet, to produce axial motion of pointer, but fixed position of unit-figure, substantially as described.

3. The combination of the axially-turning pointer D, having forked pawls $f$, with the fixed double ratchet $f$, releasing spring-arms E, and sliding and spring-acted object-holders F, substantially as set forth.

RICHARD W. KAVANAUGH.

Witnesses:
W. F. ROWLAND,
R. M. STANLEY.